US011188353B2

(12) United States Patent
Byard et al.

(10) Patent No.: US 11,188,353 B2
(45) Date of Patent: Nov. 30, 2021

(54) RUNTIME EXTENSION SYSTEM FOR BUNDLED WEB APPLICATION (71) Applicant: VMware, Inc., Palo Alto, CA (US)

(72) Inventors: David Mark William Byard, San Jose, CA (US); Jeffrey Moroski, South Abington Township, PA (US)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 16/033,790

(22) Filed: Jul. 12, 2018

(65) Prior Publication Data
US 2020/0019414 A1   Jan. 16, 2020

(51) Int. Cl.
| G06F 7/04 | (2006.01) |
| G06F 9/445 | (2018.01) |
| G06F 21/62 | (2013.01) |
| G06F 9/54 | (2006.01) |
| H04N 7/16 | (2011.01) |
| G06F 9/4401 | (2018.01) |
| G06F 16/951 | (2019.01) |

(52) U.S. Cl.
CPC ........ G06F 9/44526 (2013.01); G06F 9/4401 (2013.01); G06F 9/547 (2013.01); G06F 16/951 (2019.01); G06F 21/629 (2013.01)

(58) Field of Classification Search
CPC .. G06F 9/44526; G06F 16/951; G06F 9/4401; G06F 9/547; G06F 21/629
See application file for complete search history.

(56) References Cited

U.S. PATENT DOCUMENTS

| 5,774,722 A * | 6/1998 | Gheith | G06F 9/44521 |
| | | | 719/331 |
| 8,200,962 B1 * | 6/2012 | Boodman | H04L 63/0823 |
| | | | 713/161 |
| 9,083,770 B1 * | 7/2015 | Drose | H04L 65/608 |
| 2006/0277537 A1 * | 12/2006 | Chan | G06F 8/65 |
| | | | 717/168 |

(Continued)

OTHER PUBLICATIONS

Christopher Gosselin, Dynamically Creating Components With Angular 2.0, Sep. 23, 2016, 9 pages, http://blog.rangle.io/dynamically-creating-components-with-angular-2/.

(Continued)

Primary Examiner — Darshan I Dhruv
(74) Attorney, Agent, or Firm — Patterson + Sheridan, LLP (57) ABSTRACT Techniques disclosed herein permit bundled web applications to be extended at runtime. In particular, the functionality of a container application that is a bundled web application may be extended by extensions that are also bundled web applications. To enable such extensibility, the container application registers reusable portion(s) of its code in a global context during a bootstrapping sequence of the container application. Thereafter, extensions that are loaded may access and utilize the registered portion(s) of code, as if those extensions had been bundled together with the rest of the container application. In addition, extensions may be managed using scoping and/or permissions that control access to the extensions based on the container application mode that the extensions can be used with and white lists of users who are allowed to use the extensions, respectively.

20 Claims, 5 Drawing Sheets

(56) References Cited

U.S. PATENT DOCUMENTS

| | | | | | |
|---|---|---|---|---|---|
| 2009/0249311 | A1* | 10/2009 | Dandamudi | ........ | G06F 9/45504 717/139 |
| 2012/0102485 | A1* | 4/2012 | Goldman | ................ | G06F 8/64 717/176 |
| 2012/0185863 | A1* | 7/2012 | Krstic | .................... | G06F 21/51 718/104 |
| 2012/0215831 | A1* | 8/2012 | Urbach | ............... | G06F 9/44584 709/203 |
| 2013/0283251 | A1* | 10/2013 | Poore | ..................... | G06F 9/546 717/166 |
| 2013/0311593 | A1* | 11/2013 | Prince | .................... | H04L 67/42 709/213 |
| 2014/0122999 | A1* | 5/2014 | Falkenberg | ............. | G06F 40/14 715/234 |
| 2015/0019679 | A1* | 1/2015 | Prince | .................... | H04L 47/70 709/213 |
| 2015/0089575 | A1* | 3/2015 | Vepa | ....................... | G06F 21/62 726/1 |
| 2015/0128105 | A1* | 5/2015 | Sethi | ......................... | G06F 8/36 717/106 |
| 2015/0135163 | A1* | 5/2015 | Mun | .......................... | G06F 8/71 717/120 |
| 2015/0180875 | A1* | 6/2015 | Kay | ...................... | H04L 63/102 726/4 |
| 2015/0207852 | A1* | 7/2015 | Boodman | ................. | G06F 8/61 709/203 |
| 2015/0227380 | A1* | 8/2015 | Lingg | ..................... | G06F 9/445 707/693 |
| 2015/0347617 | A1* | 12/2015 | Weinig | .................. | H04L 63/145 715/234 |
| 2015/0347749 | A1* | 12/2015 | Kiehtreiber | ............. | G06F 8/656 726/26 |
| 2015/0378742 | A1* | 12/2015 | Harrington | ............. | G06F 9/542 719/318 |
| 2016/0232252 | A1* | 8/2016 | Cao | ........................ | G06F 16/957 |
| 2016/0246592 | A1* | 8/2016 | Jamjoom | ................ | G06F 9/547 |
| 2016/0321051 | A1* | 11/2016 | Austel | .................... | H04L 67/025 |
| 2017/0123783 | A1* | 5/2017 | Liu | .......................... | G06F 9/451 |
| 2017/0154017 | A1* | 6/2017 | Kristiansson | .......... | G06F 9/4843 |
| 2017/0249177 | A1* | 8/2017 | Liggitt | ...................... | G06F 8/38 |
| 2017/0250853 | A1* | 8/2017 | Evans | ....................... | G06F 9/54 |
| 2017/0344227 | A1* | 11/2017 | Stoicov | .................. | G06F 16/168 |
| 2018/0173390 | A1* | 6/2018 | Dunne | ..................... | G06F 9/547 |
| 2019/0007517 | A1* | 1/2019 | Jagannath | ................ | G01D 5/00 |
| 2019/0266226 | A1* | 8/2019 | Kirn | ........................ | G06F 40/137 |
| 2019/0266227 | A1* | 8/2019 | Kirn | ........................ | G06F 40/143 |
| 2019/0303123 | A1* | 10/2019 | Levac | ................. | G06F 9/44521 |
| 2019/0325072 | A1* | 10/2019 | Barber | .................... | G06F 9/547 |
| 2019/0379748 | A1* | 12/2019 | Gasnier | ............... | G06F 9/44526 |
| 2020/0364285 | A1* | 11/2020 | Isager | ................. | G06F 16/9577 |

OTHER PUBLICATIONS

Gion Kunz, Mastering Angular 2 Components, Jun. 2016, 4 pages, https://www.packtpub.com/web-development/mastering-angular-2-components.

Angular 2 Synchronous Dynamic Component Creation, Jun. 15, 2016, 10 pages, https://docs.google.com/document/d/1VRNIjdv-6QDY4_I0xx3DHd-IZ19QIthheMLdGGKAAzM/edit?pref=2&pli=1#.

Angular NgModule—Ahead Of Time Compilation (AOT) And Lazy Loading, 35 pages, http://blog.angular-university.io/angular2-ngmodule/.

Angular2—Dynamically load component from module, 5 pages, http://stackoverflow.com/questions/39297219/angular2-rc6-dynamically-load-componentfrom-module.

Angular2: Loading modules dynamically from a given folder, 4 pages, http://stackoverflow.com/questions/40039825/angular2-loading-modules-dynamically-from-a-given-folder.

* cited by examiner

RUNTIME EXTENSION SYSTEM FOR BUNDLED WEB APPLICATION

BACKGROUND

Web applications are developed using various technologies, such as Typescript, Sassy Cascading Style Sheets (SCSS), and ECMAScript. A module bundler can be used to compile source files in such technologies into a "bundle," which is a single file in a format, such as ECMAScript 5 along with cascading style sheets (CSS) and HyperText Transfer Protocol (HTML) 5, that web browsers can understand. Such a bundle may generally include compiled source code from JavaScript, CSS styles, HTML, and/or other types of files. Further, a bundle may include multiple languages, frameworks, and libraries. Popular module bundlers include Webpack and Rollup.js.

No traditional mechanism exists for customizing a bundled web application at runtime. As used herein, a "bundled web application" refers to a web application created using a module bundler to compile the web application's source files into a single bundle file, which may then be loaded and executed as the web application by a web browser. Traditionally, the modules in a bundled web application must be bundled together up front, and such a bundle is then loaded and executed as an isolated web application that is not customizable at runtime.

SUMMARY

One embodiment disclosed herein provides a computer-implemented method of customizing a container application. The method generally includes bootstrapping the container application from a native entry point of the container application. The bootstrapping of the container application includes registering at least a portion of code of the container application in a global context. The method further includes loading one or more extensions. The loading of each the one or more extensions includes loading a corresponding web application bundle, and each of the loaded extensions uses at least a portion of the code of the container application registered in the global context.

Another embodiment disclosed herein provides a computer-implemented method of serving a container application. The method generally includes receiving, from a web browser, a request including an address. The method further includes identifying one or more extensions to the container application based, at least in part, on the address, credentials of an authenticated user, and scoping and permissions information associated with the one or more extensions. In addition, the method includes injecting, into the container application, a list specifying the identified one or more extensions and associated addresses from which the identified one or more extensions can be loaded, and serving the container application to the web browser.

Further embodiments include computer systems configured to carry out the above methods, and non-transitory computer-readable storage media comprising instructions that cause the computer systems to carry out the above methods.

DETAILED DESCRIPTION

Embodiments disclosed herein provide techniques for extending bundled web applications at runtime. Although referred to as "extensions" herein, the terms "extensions," "modules," and "plugins" are sometimes used interchangeably. In one embodiment, the functionality of a container application that is a bundled web application may be extended by extensions that are also bundled web applications. To enable such extensibility, the container application self-registers reusable portion(s) of its code in a global context during a bootstrapping sequence of the container application. Thereafter, extensions that are loaded may access and utilize the registered portion(s) of code, as if those extensions had been bundled together with the rest of the container application. In addition, extensions may be managed using scoping and/or permissions that control access to the extensions based on the container application mode that the extensions can be used with and white lists of users who are allowed to use the extensions, respectively.

Figure 1:
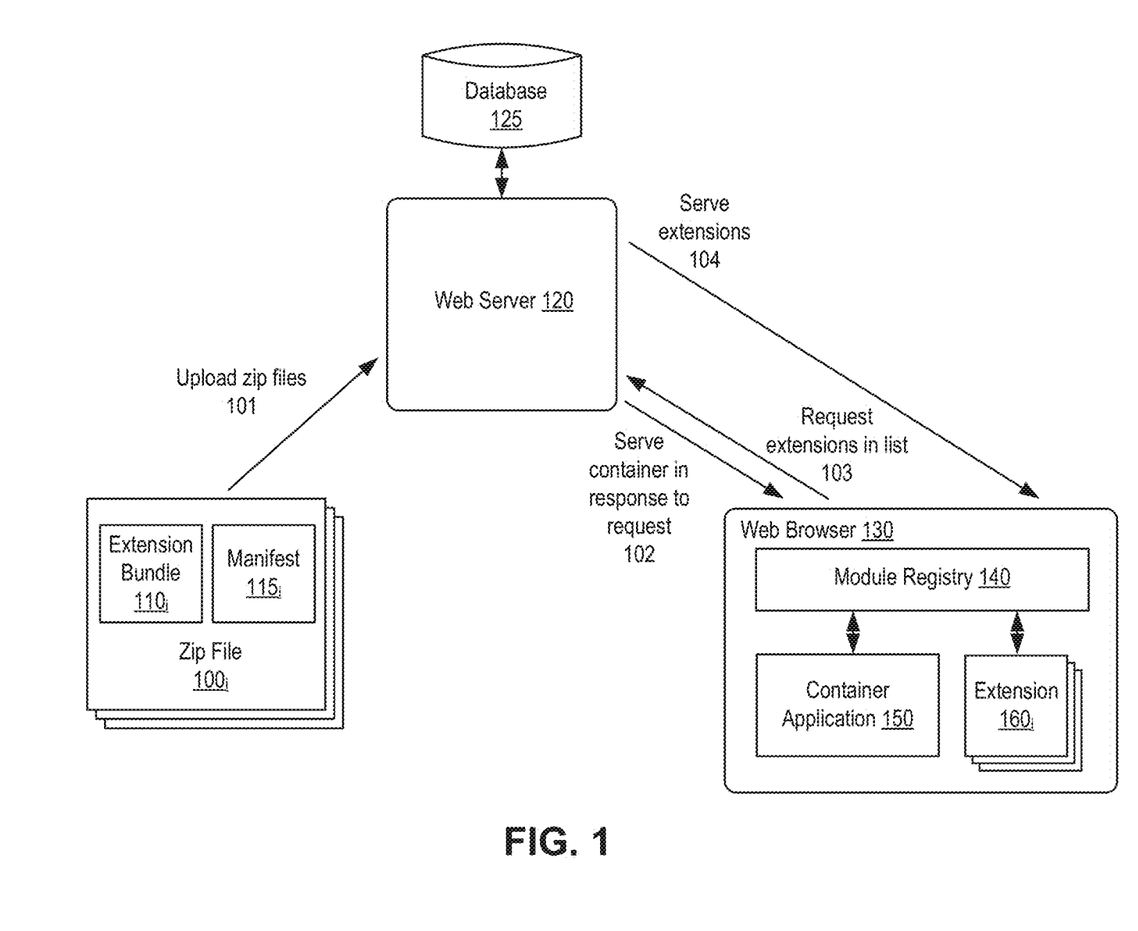
FIG. 1 illustrates an approach for extending a bundled web application at runtime, according to an embodiment.

FIG. 1 illustrates an approach for extending a bundled web application at runtime, according to an embodiment. As shown, web application bundles 110 for extending a container application 150, as well as associated manifests 115, are uploaded in zip files 100 to a web server 120 at 101. In one embodiment, extensions 110 are further registered with web server 120 and published to particular organizations and/or users. Zip files 100 may be uploaded to web server 120, and extensions 110 may be registered and published, in any suitable manner, such as via a user interface (UI) or an application programming interface (API) (e.g., a Representative State Transfer (REST) API). Extensions 110 themselves may have three lifecycle states in one embodiment: registered, in which extension metadata (from an associated manifest) is known but no zip file has been uploaded; uploaded, in which a zip file has been uploaded for the extension; and published, in which the extension has been published to particular organizations and/or users. Although the uploading of zip files 100 is used herein as a reference example, extensions 110 and manifests 115 may generally be uploaded to server 120 in any feasible manner.

Container application 150 is a single-page web application that can run in a web browser and make occasional calls to a backend server (e.g., server 120), without requiring a full page refresh. In one embodiment, container application 150 includes a basic shell, such as a log in web page used to enter user credentials and a navigation menu, as well as reusable portion(s) of code, such as common libraries and/or services that, as discussed in greater detail below, are registered in a global context for loaded extensions to use. Extensions 110 may extend the functionality of container application 150 in any feasible manner. For example, extensions 110 may provide menu entries for a top-level navigation menu in container application 150, new webpages or panels (e.g., that display information, permit users to manage technologies, etc.), a footer link with modal text content, a tab with text content, a custom menu or menu option, and so on. Each of the extensions 110 and container application 150 may be created using a module bundler, such as Webpack or Rollup.js, to bundle (also referred to as "rolling up") a number of source files into a single bundle file. For example, the source files bundled into a single bundle file may include a package file defining the packages required for the extension such as name, description, and version; a manifest file; an internationalization file storing locale specific translations for the extension; an HyperText Transfer Protocol (HTML) file; a component file defining the extension using a configuration structure; a routes file defining routes that enable navigation between various views; a module file that organizes the extension into cohesive function blocks, and an index file. The single bundle file created from such source files and uploaded to server 120 may thereafter be loaded by a browser, which downloads and unpacks the bundle file according to an appropriate unpacking methodology, such as that of Webpack or Rollup.js.

Traditionally, bundled web applications were not customizable at runtime, as all modules of such applications had to be bundled up front, with the bundles then being loaded as isolated web applications by web browsers. It should be understood that if extensions 160 and container application 150 were such traditional bundled web applications, then extensions 160 and container application 150 would be isolated from each other. By contrast, embodiments disclosed herein permit extensions loaded from other bundles to hook into, and extend the functionality of, container application 150 at runtime. In one embodiment, container application 150 is bootstrapped from a native entry point and, during the bootstrapping sequence, container application 150 registers reusable portion(s) of its code, such as common libraries and/or services which in turn provide an API for extended functionality, in a global context that is accessible to extensions that are loaded thereafter. For example, container application 150 may set up a SystemJS context, without loading any external files, and register the reusable portion(s) of code with the SystemJS context. Container application 150 then enumerates and loads extensions (e.g., extensions 160) that provide additional functionality to container application 150, while making use of (e.g., by importing) the portion(s) of code registered in the global context. Continuing the example in which container application 150 registers reusable portion(s) of code with the SystemJS context, extensions 160 may be loaded as SystemJS modules, allowing extensions 160 to resolve and call libraries and/or services in the same JS context as container application 150. As a result, container application 150 and extensions 160, which are each self-contained applications and may have been bundled up with their own libraries, are able to run in a shared space with a relatively deep level of integration, including the ability to share data and influence the behavior of each other.

In one embodiment, server 120 may manage extensions 110 based on scoping and/or permissions information stored in a database 125. As used herein, scoping refers to tagging an extension with a container application 150 mode that the extension can be used with. Scoping and permissions, discussed in greater below, may be used to control access to extensions 110. For example, in the case of virtual data centers that are provided by cloud service providers and used by tenants, the container application 150 may be extended to provide different user interfaces (i.e., web portals) for tenants, who may create and manage virtual computing instances (e.g., virtual machines or containers) and perform related tasks, and service providers, who may manage the underlying resources and provision and manage tenants. In such a case, the scope of extensions 110 may specify whether those extensions 110 are to be loaded for the tenant or service provider user interfaces (UIs) of container application 150, or both. As a result, the same container application 150 may be modified with different extensions that are published to service providers or tenants, or both, based on the scoping of those extensions, in order to provide different service provider and tenant UIs. Further, when container application 150 is bootstrapped into the different scopes (e.g., tenant or service provider) associated with respective UIs, container application 150 may register different common libraries and/or services in the global context and have different container behaviors. It should be understood that scoping allows different web applications (e.g., for tenants and service providers) to share the same container, while maintaining a logical wall between the different web applications.

In addition to scoping, permissions may be specified for each extension 110 indicating whether that extension 110 is available to all users who load the container application 150 UI (e.g., the UI of the tenant or service provider), or to a white listed set of such users. Returning to the service provider and tenant example, within each of the service provider and tenant scopes, permissions may include role-based access control (RBAC) rights that a user must have (in addition to an extension being scoped and published to the container application 150 UI that the user loads) in order to access a particular extension. Publishing formally defines who is allowed, within each scope, to load an extension. For example, an extension may be published to users in a set of tenant organizations, or to any other set of users (e.g., a set of users defined based on geographical location or clearance level). Server 120 ensures that users who do not have the requisite permissions cannot load an extension, or even know of the extension's existence. For example, server 120 may send a "forbidden" or "not found" code if the user tries to manually load the extension.

Illustratively, extensions 110 to container application 150 are registered with server 120 and published to users (and/or organizations), and particular extensions 110 may then be loaded based on scoping and/or permissions information, as specified in the associated manifest information. In one embodiment, each manifest $115_i$ includes metadata specifying an identifier (e.g., a uniform resource name (URN) identifier) and name of the associated extension $110_i$, a description of the associated extension $110_i$, a vendor, a license, supported container application 150 versions, scoping and/or permissions, a link (e.g., a URL) to supporting content for the associated extension $110_i$, a module in the associated extension $110_i$ to be loaded dynamically as the main entry point into the extension, a top level URL route that the module can use to register child routes under, and requirements for the associated extension $110_i$ to function properly. Each manifest 115, (or another file) may also include translation keys and strings, and in such a case, container application 150 may provide a shared translation service to extensions using the translation keys and strings in associated manifests 115 (or other files).

Returning to the virtual data center example, a cloud service provider may upload an extension and associated manifest specifying, among other things, that the extension is scoped to a tenant UI. In turn, server 120 parses such a manifest and stores a representation (e.g., a record in a relational database table) of the manifest information, including the scoping and/or permissions information, in database 125. The use of database 125 permits associations to be made between, e.g., users whose information is also stored in database 125 and the scoping and/or permissions information stored in database 125, which may have relational database associations with each other in one embodiment. As a result, server 120 may query database 125 to determine the extensions 110 that should be loaded along with container application 150, based on the stored scoping and/or permissions (e.g., RBAC rights) information and a current user who has logged in via, e.g., the container application 150 log in webpage and whose associated information (e.g., indicating whether the user is a service provider or tenant and the user's role) is stored in database 125 (or elsewhere).

As described, extensions 110 and manifests 115 may be uploaded to server 120 in, e.g., zip files 100. In one embodiment, server 120 may unpack each such zip file 100$_i$, parse the manifest 115$_i$ therein, and store the manifest information as well as a serialization of the extension bundle (as a blob) in database 125. In a particular embodiment, server 120 may be a highly-available, load-balanced server group in which a cluster of cell applications are in communication with database 125. In such a case, in addition to storing the serialized extension bundle in database 125 from which the bundle is always available, copies of the unpacked zip file directories may be stored on a number of server computers in the server group, each of which may act as a web server capable of serving extension bundles to web browsers.

In response to a request from browser 130 at 102, server 120 determines and injects a list of extensions into container application 150, and serves such a container application 150 to browser 130. As described, server 120 may determine extensions that should be loaded based on a current user who has logged in via, e.g., the container application 150 log in webpage, and scoping and/or permissions information stored in database 125. In one embodiment, the URL (i.e., address) specified in the request from browser 130, which is associated with the UI to be displayed and extension scope, and authenticated credentials of the user, may be used to query database 125 for the appropriate extensions to include in the list of extensions. As described, the credentials of the user may be entered via, e.g., the container application 150 log in webpage, which in one embodiment does not load any extensions and may be considered a separate component/application facilitating slip-streaming optimization, discussed in greater detail below. HTTP Authorization, Security Assertion Markup Language (SAML), OpenID, or any other suitable technique may be used to authenticate the user. In an alternative embodiment, a user may log in through container application 150 with a minimal or empty set of extensions loaded, and container application 150 may then, based on the user's credentials, request from server 120 a new list of extensions to load.

In one embodiment, server 120 injects the determined list of extensions into container application 150 by adding a script into a server-rendered HTML webpage (e.g., a JSP, PHP, or ASP.NET webpage) from which container application 150 is bootstrapped, which is a "slip-streaming" optimization. In such a case, the script may execute when container application 150 is loaded and add the list of extensions to a window object. Further, container application 150 may load each of the extensions (e.g., extensions 110) in the list from a respective location specified in the list. In other embodiments, rather than injecting the list of extensions via a script, any valid HTML (e.g., a template tag or custom elements) or HTTP headers may be used to inject the list of extensions. In yet another embodiment that does not involve slip-streaming optimization, container application 150 may include an index webpage (e.g., an index.html) that launches the web application and queries with server 120 to determine what extensions are available to container application 150, as well as other environmental information (e.g., a tenant organization, locale, and whether the web application is in a production mode or not). It should be understood that use of the slip-streaming optimization described above avoids performing such a query and reduces bootstrap complexity.

Illustratively, server 120 itself hosts extensions to container 150 and serves such extensions, which may prevent users who are not permitted to load extensions from accessing files associated with those extensions. In a less strict embodiment, locations specified in the list of extensions may include links to other hosting service(s), such as a cloud hosting service, where extensions can be downloaded from.

In one embodiment, a module of an extension 160$_i$ specified in the associated manifest may be used as the main entry point into the extension application. During its bootstrapping sequence, container application 150 self-registers reusable portion(s) of its own code in a global context, by registering the portion(s) of code with a module loader registry 140 such as the Asynchronous Module Definition (AMD) system or otherwise. After the reusable portion(s) of container application's 150 code are registered in the global context, extensions 160 that are loaded may access and utilize the registered portion(s) of code, as if extensions 160 had been bundled together with the rest of container application 150. Returning to the virtual data center example, the portion(s) of code that container application 150 registers may include libraries and/or services that provide an API for extended functionality to loaded extensions 160, such as the ability to register new navigation routes (e.g., menu entries in a navigation menu of container application 150) and/or access message bus(es) (e.g., to display a dialog box), display input mechanism(s), data store(s) (e.g., a Redux store) holding a state tree of the application for state manipulation, backend services (e.g., by communicating with a backend server), dependency injection system(s), class definition(s), method(s), variable(s), and/or constant(s). Registering such portion(s) of code in the global context allows extensions 160 that are loaded from other bundles to see the registered portion(s) of code, as bundled web applications are able to see within themselves and the global context but not inside other bundled web applications. For example, loaded extensions 160 may import the portion(s) of code registered in the global context and invoke an API provided by the libraries and/or services therein to register new navigation routes and/or access message bus(es), display input mechanism(s), data store(s), dependency injection system(s), class definition(s), method(s), variable(s), and/or constant(s).

In another embodiment, a software development kit (SDK) may provide a container application without any extensions, as well as a development environment and testing server, thereby permitting users to create and test extensions to the container application. For example, the SDK may include a Webpack-based development server that provides an empty container to bootstrap extensions into for local development and testing purposes. It should be understood that with such an SDK, testing an extension does not require zipping up an extension bundle along with a manifest, uploading the zip file to and registering the extension with a web server (e.g., server 120), loading the extension as part of a live-running webpage, etc., which would otherwise be required to test the extension. Further, in some embodiments the SDK may provide bindings for registering extensions, as well as a seed project with basic files such a root module, that a user can follow along with to learn to build an extension in a recommended manner.

Figure 2:
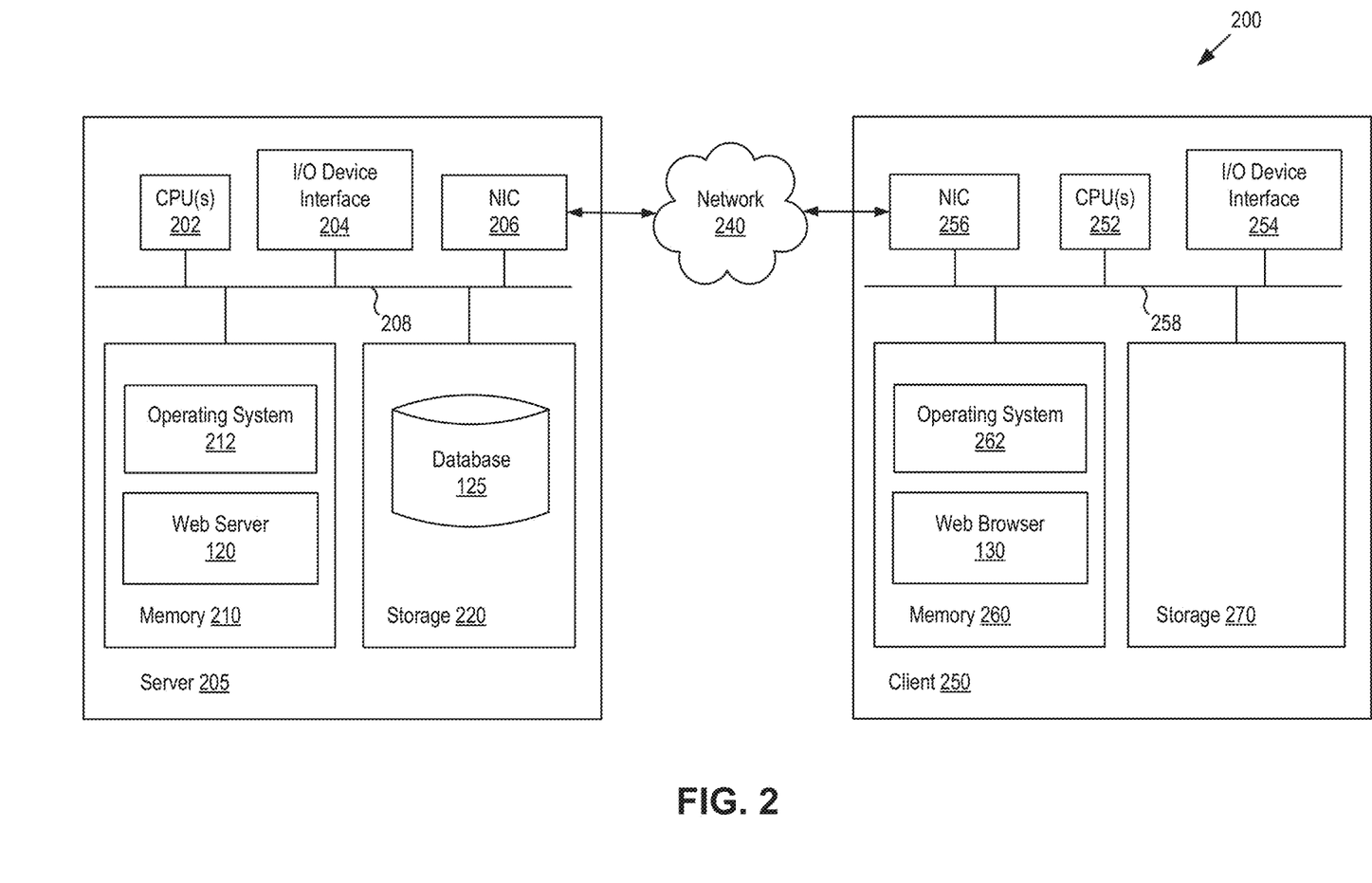
FIG. 2 illustrates components of a system in which an embodiment may be implemented.

FIG. 2 illustrates a system 200 in which an embodiment may be implemented. As shown, system 200 includes a server computing system 205 in communication with a client computing system 250 over a network 140. Illustratively, server computing system 205 includes central processing unit(s) (CPU(s)) 202, a network interface (shown as a network interface card) 206 connecting server computing system 205 to a network 240, an interconnect 208, a memory 210, and storage 220. Server computing system 205 also includes an I/O device interface 204 for connecting I/O devices (e.g., keyboard, display and mouse devices) to server computing system 205.

CPU(s) 202 retrieve and execute programming instructions stored in memory 210. Similarly, CPU(s) 202 store and retrieve application data residing in memory 210. Interconnect 208 facilitates transmission, such as of programming instructions and application data, between CPU(s) 202, I/O device interface 204, storage 220, network interface 206, and memory 210. CPU(s) 202 are included to be representative of a single CPU, multiple CPUs, a single CPU having multiple processing cores, and the like. Memory 210 is generally included to be representative of a random access memory. Storage 220 may be a disk drive or other type of storage device. Although shown as a single unit, storage 220 may be a combination of fixed and/or removable storage devices, such as magnetic disk drives, flash drives, removable memory cards or optical storage, network attached storage (NAS), and/or a storage area-network (SAN). Further, server computing system 205 is included to be representative of a physical computing system as well as virtual machine instances hosted on a set of underlying physical computing systems. Although shown as a single computing system, it should be recognized that the components of server computing system 205 shown in FIG. 2 may be distributed across multiple computing systems connected by a data communications network.

As shown, memory 210 includes an operating system 212 and web server application 120. For example, operating system 212 may be Linux® or Windows®. In one embodiment, web server 120 is configured to receive extensions being registered and associated manifests that are uploaded in zip files, store the extensions and representations of manifest information in database 125, and serve container application 150 and extension bundles (to, e.g., web browser 130) based on a current user and scope and/or permissions information stored in database 125. Although shown for illustrative purposes as a single application in memory 210, web server 120 may generally be implemented in any feasible manner. In an alternative embodiment, web server 120 may run in a group of servers acting as a highly available and load balanced server cluster, with each server storing a copy of the container application 150 bundle and unpacked zip directories including extension bundles, as described above.

Client computing system 250 includes CPU(s) 252, a network interface 256 connecting client computing device 250 to network 240, an interconnect 258, a memory 260, storage 270, and an I/O device interface 254, which may perform similar functionality as CPU(s) 202, network interface 206, interconnect 208, memory 210, storage 220, and I/O device interface 204 of server computing system 205, described above, and will not be discussed in detail herein for conciseness. As shown, memory 260 includes an operating system (e.g., Linux® or Windows®) and web browser 130. Web browser 130 may be any software application capable of retrieving, displaying, and traversing information over a network such as the Internet. For example, web browser 130 may be an Internet Explorer®, Firefox®, Chrome®, or Safari® browser. In one embodiment, web browser 130 is configured to load container application 150, which as described is a bundled web application that registers reusable portion(s) of code in a global context during its bootstrapping sequence, as well as enumerates and loads extensions 160, which are also bundled web applications and may use the portion(s) of code registered by container application 150. In such a case, container application 150 and extensions $180_{1-N}$ would be able to interface with each other via the registered portion(s) of container application's 150 code, as described above.

Figure 3:
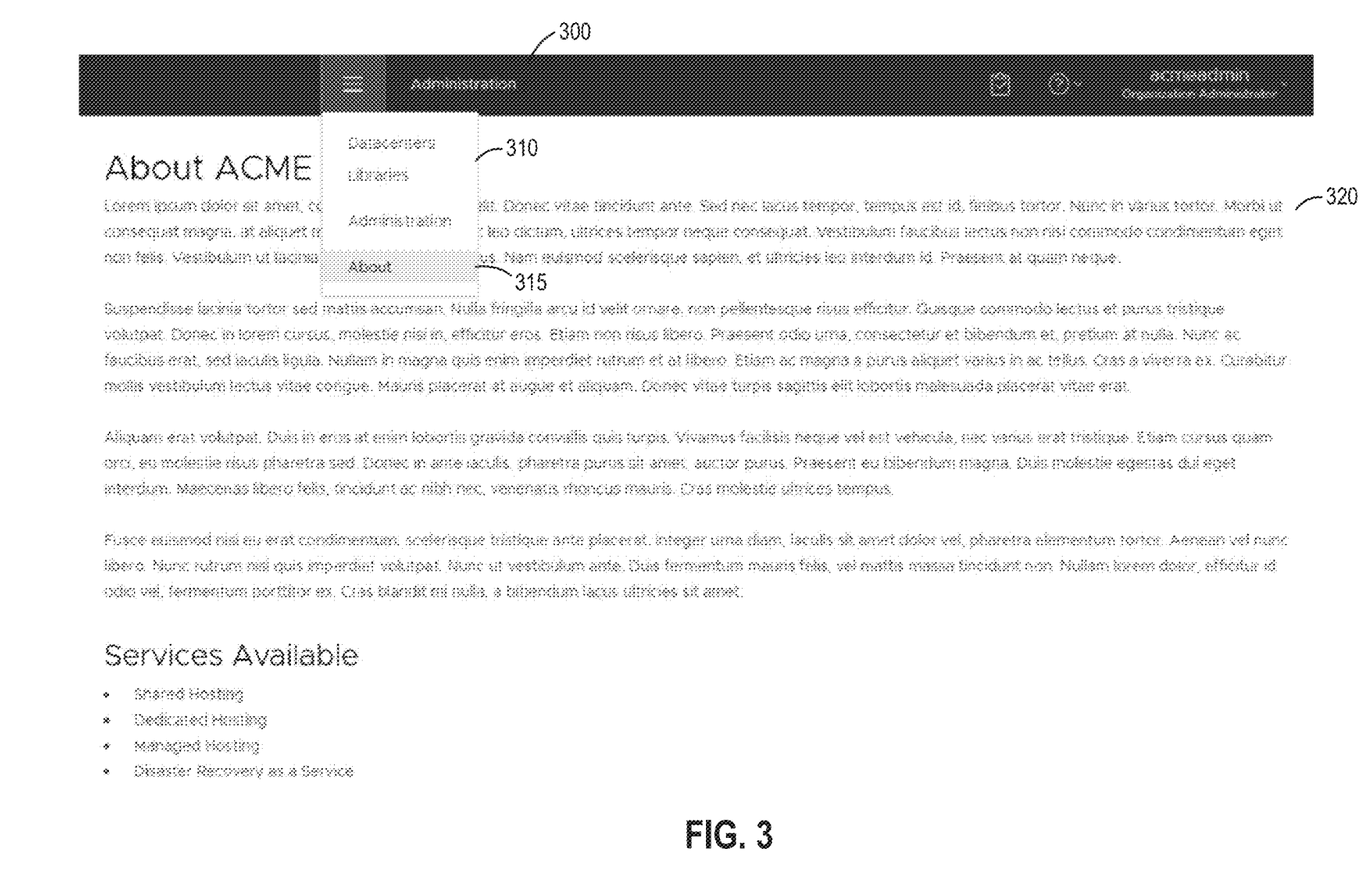
FIG. 3 illustrates an example user interface of a container application that has been extended, according to an embodiment.

FIG. 3 illustrates an example UI of container application 150 that has been extended, according to an embodiment. As shown, an extension adds an "About" menu entry 315 to a top-level navigation menu 310 in a UI 300 provided by container application 150. Similarly, other menu entries in top-level navigation menu 310 (e.g., "Datacenters," "Libraries," "Administration") may also be added by extensions, and such extensions that add navigation menu entries may contribute to navigation in container application 150 by, e.g., loading content when a user navigates to the menu entry. Illustratively, content 320 associated with the "About" menu entry 315 has been loaded and displayed in response to a user navigating to the "About" menu entry 315. In one embodiment, container application 150 registers globally (e.g., with a module loader registry such as AMD) a service that permits extensions to register entries in top-level navigation menu 310. Thereafter, extensions that are loaded may access and use such a service to register menu entries, such as the "About" menu entry 315, in navigation menu 310.

Although an extension to top-level navigation menu 310 is shown for illustrative purposes, other extension points may also be available in some embodiments. For example, the other extension points may include particular UI screens or entities. Returning to the virtual data center example, extensions may be associated with, e.g., a virtual computing instance entity (or some other resource type) such that, when a new panel or screen is displayed showing details of a particular virtual computing instance, the extension(s) associated with that virtual computing instance are loaded. In such a case, the extensions loaded for the virtual computing instance entity would not be loaded during the bootstrapping sequence of container application 150, described above. That is, although discussed herein primarily with respect to extensions being loaded during bootstrapping of container application 150 and served by server 120, extensions may generally be loaded from anywhere (e.g., an app store-like framework may be provided from which extensions may be loaded), and at any time, to add functionality to container application 150. Similar to extensions loaded during the bootstrapping of container application 150, extensions that are inserted at other extension points may register to add functionality and/or be provided access to message bus(es), display input mechanism(s), data store(s), dependency injection system(s), class definition(s), method(s), variable(s), and/or constant(s).

Figure 4:
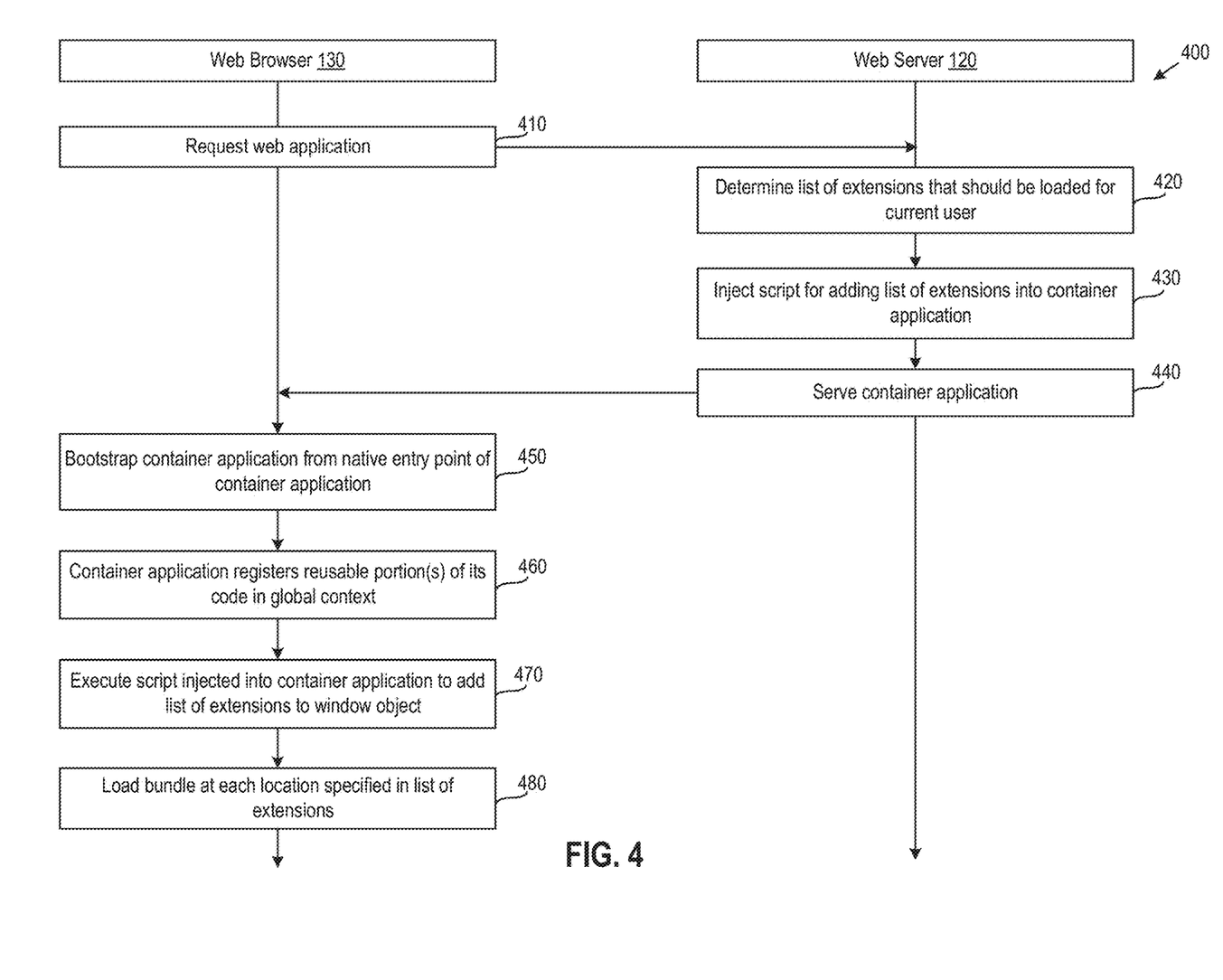
FIG. 4 illustrates a method of loading a bundled web application, according to an embodiment.

FIG. 4 illustrates a method 400 of loading a web application, according to an embodiment. As shown, method 400 begins at step 410, where web browser 130 sends a request for a web application to web server 120. For example, browser 130 may establish a Transmission Control Protocol/Internet Protocol (TCP/IP) connection with server 120, and make a Hyper Text Transfer Protocol (HTTP) request that specifies, among other things, a URL associated with the web application.

At step 420, server 120 determines a list of extensions 110 that should be loaded for a current user. In one embodiment, server 120 may determine extensions 110 to include in the list based on the URL specified in the request from browser 130, the credentials of an authenticated user (e.g., after the user has logged in via the container application 150 log in webpage), and extension scope and/or permissions information stored in database 125. Returning to the virtual data center example, in which extensions may be available on a per cloud tenant or cloud provider basis, server 120 may use the URL and authenticated credentials, of a particular cloud tenant or provider, to query database 125 for extensions that should be loaded for that tenant or provider, based on the extension scope and/or permissions information stored in database 125.

At step 430, server 120 injects a script for adding a list of extensions into container application 150. As described, container application 150 is a bundled web application that may include, e.g., a login webpage, a navigation menu, and reusable portion(s) of code, among other things. In one embodiment, server 120 dynamically generates a <script> element that server 120 includes in a server-rendered HTML webpage (e.g., a JSP, PHP, or ASP.NET webpage) from which container application 150 is bootstrapped, and such a script may then be executed when browser 130 loads the server-rendered HTML webpage. In particular, server 120 may generate the script to add, to a window object, a list of extensions including location URLs, and code included in container application 150 may thereafter execute to load each of the extensions in the list.

Although discussed herein primarily with respect to injecting the list of extensions via a script, in alternative embodiments any valid HTML (e.g., a template tag or custom elements) or HTTP headers may be used to inject the list of extensions. In yet another embodiment which does not involve slip-streaming optimization, container application 150 may include an index webpage that launches the web application and queries with server 120 to determine what extensions are available to container application 150 as well as other environmental information, as described above.

At step 440, server 120 serves container application 150 to browser 130, in response to the request from browser 130. Subsequent to receiving container application 150 from server 120, browser 130 bootstraps container application 150 from a native entry point of container application 150 at step 450. In one embodiment, container application 150 is bootstrapped from the server-rendered HTML webpage described above. The use of a native entry point to bootstrap container application 150 differs from traditional bootstrapping in encapsulated bundling technologies such as Webpack, which required the registration of all code of a bundled web application with a module loader registry and the use of the module loader registry itself as the entry point.

At step 460, container application 150 registers reusable portion(s) of its code in a global context. In one embodiment, container application 150 registers the reusable portion(s) of code with a module loader registry (e.g., module loader registry 140), which may be the AMD system or any other mechanism permitting code be registered and placed in a global context of web browser 130. Such registering of the portion(s) of container application's 150 code may involve registering pointers into container application 150. For example, container application 150 may set up a SystemJS context, without loading any external files, and register the reusable portion(s) of code with the SystemJS context. The registry functionality may be emulated in another embodiment, which may permit proxying and versioning. As described, the reusable portion(s) of code that are registered by container application 150 may include, e.g., a library including functions for communicating with a backend server or displaying a dialog box or input mechanism, a service for registering a menu entry in a navigation menu of container application 150, and the like. More generally, the registered portion(s) of code may include libraries and/or services that provide any helpful functionality to extensions, such as the ability to register new navigation routes or message bus(es), display input mechanism(s), data store(s), dependency injection system(s), class definition(s), method(s), variable(s), and/or constant(s).

At step 470, the script injected into container application 150 is executed (by browser 130) to add a list of extensions to a window object. A window object represents a browser window including a Document Object Model (DOM) document. In one embodiment, the list of extensions may be added to the window object in a map<id, location> format, such as "thirdPartyExtensions: {'f4714f09-778e-4992-8b84-c5484192fbc2': 'https://{baseURl}/tenant/{tenantName}/uiPlugins/f4714f09-778e-4992-8b 84-c5484192fbc2/80964212-5692-4477-ab18-fd989292d5c6', . . . }." The locations in the list of extensions, which may be URLs such as "https://{baseURl}/tenant/{tenantName}uiPlugins/f4714f09-778e-4992-8b84-c5453084192fbc2/80964212-5692-4477-ab 18-fd989292d5c6," uniquely identify endpoints that each registered extension in the list can be loaded from.

As described, server 120 may itself host extensions to container 150 and serve such extensions in one embodiment, in order to prevent users who are not permitted to load extensions from accessing files associated with those extensions. In such a case, the location URLs in the list of extensions may be served by server 120. In an alternative embodiment, the location URLs in the list of extensions may include links to other hosting service(s), such as a cloud hosting service, where the extensions are hosted and can be downloaded from.

At step 480, container application 150 loads the extension bundle at each location specified in the list of extensions. In one embodiment, container application 150 includes code that executes during its bootstrapping sequence and goes through the list of extensions, loading the bundles at each location specified in the list. As described, loading a bundle may include downloading and unpacking the bundle according to an appropriate unpacking methodology, such as that of Webpack or Rollup.js. In one embodiment, a module of each extension 160, that is specified in the associated manifest may be used as the main entry point into the extension application, as described above. In such a case, container application 150 may load each extension 160, and register those extensions 160 as, e.g., top-level extensions, after which container application 150 may notify the common libraries and/or services that extensions 160 have been loaded. The Extensions 160 that are loaded may thereafter access and use the common libraries and/or services registered in the global context. Returning to the example in which container application 150 registers reusable portion(s) of code with the SystemJS context, extensions 160 may be loaded as SystemJS modules, allowing extensions 160 to resolve and call the API provided by the libraries and/or services in the same JS context as container application 150.

In addition to the loading of extensions 160, manifests associated with loaded extensions 160 may also be made available to browser 130 in some embodiments. In one embodiment, manifest information may be included in the extension bundles that are downloaded by browser 130. Alternatively, such manifest information may be separately downloaded by web browser 130 (e.g., manifests 115 themselves may be downloaded). The manifest information may then be used in any feasible manner. For example, the manifest information may specify a required container version number and, if container application 150 has a lower version number than that specified in the manifest information (i.e., is not compatible with the associated extension), then container application 150 will not load the associated extension. As another example, manifests 115 (or other files) may include translation keys and strings, and container application 150 may provide a shared translation service to extensions 160 using the translation keys and strings in associated manifests 115 (or other files). As yet another example, container application 150 may be configured to display a list of loaded extensions 160, along with associated manifest information such as version numbers, vendors, licenses, and/or support links.

In another embodiment, container application 150 may be configured to disable certain extensions. For example, extensions that are problematic may be disabled, such that container application 150 does not load those extensions, even if the extensions appear in a list of extensions to load.

Figure 5:
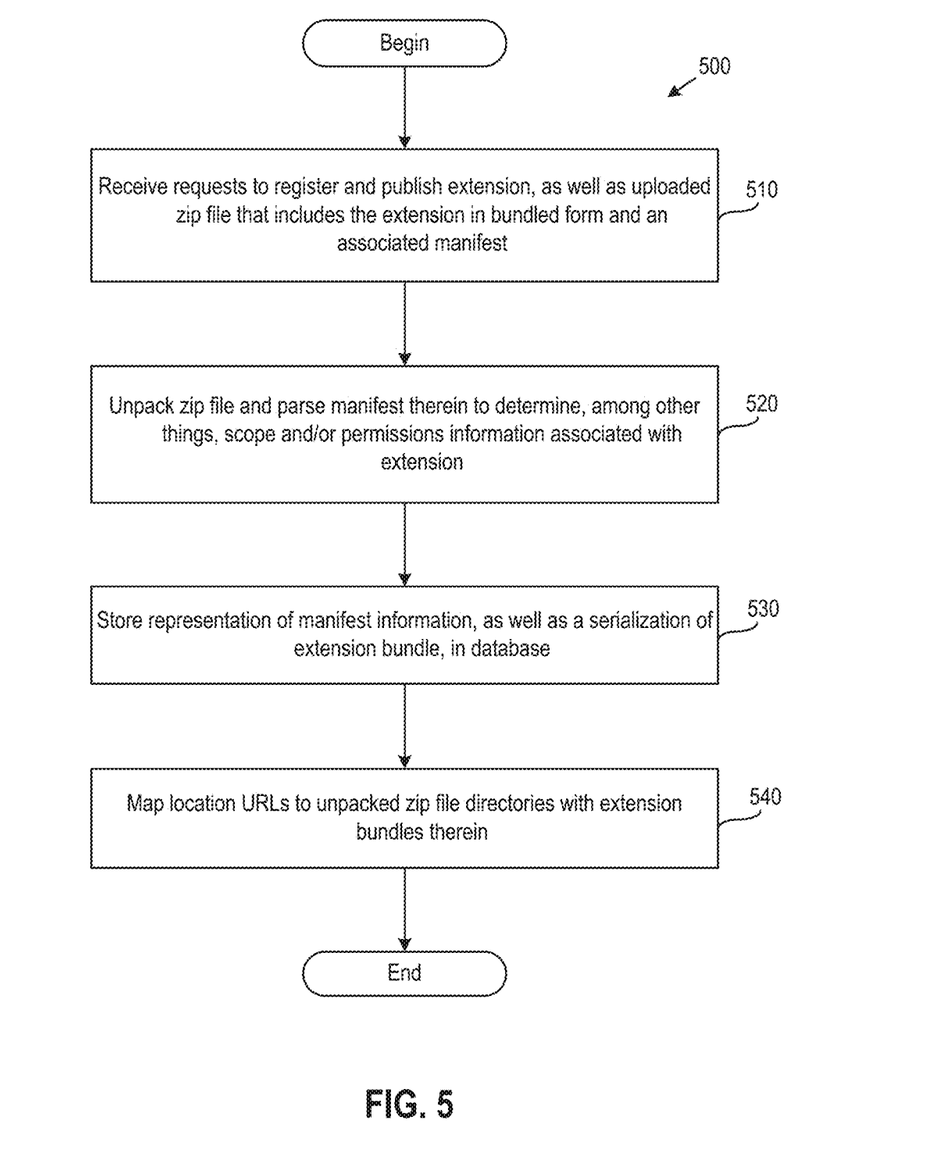
FIG. 5 illustrates a method of uploading and registering an extension to a container application, according to an embodiment.

FIG. 5 illustrates a method 500 of uploading and registering an extension to container application 150 with web server 120, according to an embodiment. As shown, method 500 begins at step 510, where server 120 receives requests to register and publish an extension, as well as an uploaded zip file 100, that includes the extension $110_i$ in bundled form and an associated manifest $115_i$. The requests to register and publish the extension, and the uploaded zip file 100, may be transmitted to server 120 over a network such as the Internet, and an UI or API (e.g., REST APIs) may be used to make such requests and upload the zip file. Returning to the virtual data center example, cloud service providers (but not tenants) may be permitted to register/publish extensions and upload zip files 100, which each include a bundled extension 110 and an associated manifest 115, to server 120 using, e.g., REST API calls.

At step 520, web server 120 unpacks the received zip file 100, and parses the manifest $115_i$ therein to determine, among other things, scope and/or permissions information relating to the extension and specified in the manifest $115_i$. As described, the manifest may, in one embodiment, include metadata specifying an identifier (e.g., a uniform resource name (URN) identifier) and name of the associated extension $110_i$, a description of the associated extension $110_i$, a vendor, a license, supported container application 150 versions, scoping and/or permissions, a link (URL) to supporting content for the associated extension $110_i$, a module in the associated extension $110_i$ to be loaded dynamically, a top level URL route that the module can use to register child routes under, and requirements for the associated extension $110_i$ to function properly. Scoping and/or permissions information in particular may be used to control access by users to the extension based on the web application mode and a whitelisted of users who can access the extension $110_i$, respectively.

At step 530, server 120 stores a representation of the manifest information and a serialization of the extension bundle in a database (e.g., database 125). In one embodiment, the representation of the manifest information may be a record in a table of database 125. Server 120 may thereafter query database 125 when a request is received for the web application (or for extensions themselves in cases where slip-streaming optimization is not used) to determine a list of extensions that should be loaded for, e.g., a particular URL and authenticated user. In one embodiment, copies of the unpacked zip file directory may be also stored on the hard disks of a number of servers in a highly-available, load-balanced server group that serve container application 150 and extension 110 bundles, as described above.

At step 540, server 120 maps location URLs to the unpacked zip file directories with extension bundles therein. Thereafter, the location URLs may be included in extension lists that may be, e.g., injected into container application 150, as described above, to uniquely identify endpoints that associated extension bundles can be loaded from.

Although discussed herein primarily with respect to adding extensions, some embodiments may also allow extensions that have been loaded to be unloaded. That is, more generally, extensions may be added or removed at runtime, or even on demand.

Advantageously, techniques disclosed herein permit self-contained bundled web applications to be extended at runtime using extensions that are themselves bundled web applications, in contrast to traditional bundled web applications that are isolated from each other. By registering reusable portion(s) of a container application's code in a global context, extensions loaded thereafter are able to access and use the registered portion(s) of code, as if those extensions had been bundled together with the rest of the container application. That is, loaded extensions are treated as the rest of the container application's code, providing a wide range of extensibility and integration with the rest of the container application. Authors of extensions may use the same interfaces to write their code as developers of the container application, and features can be first written as extensions and thereafter integrated into the main code base if desired. Further, the container application and extensions thereto, which are each self-contained applications and may be bundled up with their own libraries, can run in a shared space with a relatively deep level of integration, including the ability to share data and influence the behavior of each other. As the extensions disclosed herein can use their own libraries, such extensions need not conform to a well-defined interface by extending predefined coding libraries and implementing interfaces therein while following a specific pattern, as required in one traditional approach to extending web applications that uses a predefined contract, coding language, and structure of code for extensions. In addition, the extensions disclosed herein do not merely inline forms into larger documents, or allow anything to be displayed as in the case of HTML Inline Frames (Iframes).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. Virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of customizing a container application, comprising:
   executing the container application on a client device, wherein the container application is bootstrapped from a server-rendered webpage that includes an extension list injected therein specifying one or more extensions and, for each of the one or more extensions, an associated address from which an extension is loaded, and wherein the executing of the container application comprises:
   bootstrapping the container application from a native entry point of the container application comprising the server-rendered webpage, and
   registering, by the container application during bootstrapping of the container application, at least a portion of code of the container application in a global context, wherein the portion of code includes at least one of a library or a service, the at least one of the library or the service providing functionality to the one or more extensions configured to provide a user interface (UI) to the container application, wherein a server determines the one or more extensions based at least in part on, for each of the one or more extensions: (i) a corresponding scope indicating a corresponding mode of the container application that the extension is compatible with, and (ii) corresponding permissions of the extension indicating whether a current user is allowed to load the extension; and during runtime of the container application, loading the one or more extensions, wherein, for each of the one or more extensions, the loading includes loading a corresponding bundle at the corresponding associated address of the extension, and wherein each of the loaded one or more extensions uses functionality provided by at least the portion of the code of the container application registered in the global context to extend the functionality of the loaded one or more extensions.

2. The method of claim 1, wherein the corresponding scope and the corresponding permissions of each of the one or more extensions are specified in an associated manifest uploaded to the server.

3. The method of claim 1, wherein the at least one of the library or the service provides an application programming interface (API) that is invoked by the one or more extensions to register new navigation routes and/or access message bus(es), display input mechanism(s), data store(s), dependency injection system(s), class definition(s), method(s), variable(s), and/or constant(s).

4. The method of claim 1, wherein the at least one of the library or the service includes a first service used by at least one of the one or more extensions to register a menu entry in a navigation menu of the container application.

5. The method of claim 1, wherein the container application includes a log in webpage and a navigation menu.

6. The method of claim 1, wherein the one or more extensions are served by the server that serves the container application.

7. The method of claim 1, wherein the container application and the one or more extensions are loaded by a software development kit.

8. A computer-implemented method of serving a container application, wherein the container application is bootstrapped from a server-rendered webpage that includes an extension list injected therein specifying one or more extensions and, for each of the one or more extensions, an associated address from which an extension is loaded, the method comprising:

receiving, from a web browser, a request for a web application, the request including an address;

bundling one or more source files of the web application into the container application;

identifying the one or more extensions to the container application based at least in part on the address, and, for each of the one or more extensions: corresponding scope indicating a corresponding mode of the container application that the extension is compatible with, and corresponding permissions of the extension indicating whether a current user is allowed to load the extension;

injecting, into the container application, the extension list specifying the identified one or more extensions and the one or more associated addresses from which the identified one or more extensions are loaded; and serving the container application to the web browser.

9. The method of claim 8, wherein injecting the extension list into the container application includes injecting a script which includes the extension list and is configured to add the extension list to a window object of the web browser.

10. The method of claim 8, wherein the extension list is injected via at least one of a template tag, a custom element, or a HTTP header.

11. The method of claim 8, wherein:
the corresponding scope and the corresponding permissions of each of the one or more extensions are derived from one or more manifests associated with the one or more extensions; and
the corresponding scope and the corresponding permissions of each of the one or more extensions are stored in a database.

12. The method of claim 8, further comprising, receiving one or more zip files that each include a respective bundle of one of the one or more extensions and an associated manifest.

13. The method of claim 8, further comprising, serving one or more bundles of the one or more extensions specified in the extension list responsive to one or more requests from the web browser specifying the one or more addresses associated with the one or more extensions.

14. The method of claim 8, wherein the container application includes a log in webpage and a navigation menu.

15. A system, comprising:
a processor; and
a memory, wherein the memory includes an application program configured to perform operations for extending a container application, the operations comprising:
executing the container application on a client device, wherein the container application is bootstrapped from a server-rendered webpage that includes an extension list injected therein specifying one or more extensions and, for each of the one or more extensions, an associated address from which an extension is loaded, and wherein the executing of the container application comprises:
bootstrapping the container application from a native entry point of the container application comprising the server-rendered webpage, and
registering, by the container application during bootstrapping of the container application, at least a portion of code of the container application in a global context, wherein the portion of code includes at least one of a library or a service, the at least one of the library or the service providing functionality to one or more extensions configured to provide a user interface (UI) to the container application, wherein a server determines the one or more extensions based at least in part on, for each of the one or more extensions: (i) a corresponding scope indicating a corresponding mode of the container application that the extension is compatible with, and (ii) corresponding permissions of the extension indicating whether a current user is allowed to load the extension; and
during runtime of the container application, loading the one or more extensions, wherein, for each of the one or more extensions, the loading includes loading a corresponding bundle at the corresponding associated address of the extension, and wherein each of the loaded one or more extensions uses functionality provided by at least the portion of code of the container application registered in the global context to extend the functionality of the loaded one or more extensions.

16. The method of claim 1, further comprising:
requesting, by the client device, a web application from the server; and in response to the request, receiving, from the server, the container application, wherein the container application comprises a bundle of one or more source files of the web application.

17. The system of claim 16, wherein the corresponding scope and the corresponding permissions of each of the one or more extensions are specified in an associated manifest uploaded to the server.

18. The system of claim 15, wherein the at least one of the library or the service provides an application programming interface (API) that is invoked by the one or more extensions to register new navigation routes and/or access message bus(es), display input mechanism(s), data store(s), dependency injection system(s), class definition(s), method(s), variable(s), and/or constant(s).

19. The system of claim 15, wherein the at least one of the library or the service includes a first service used by at least one of the one or more extensions uses to register a menu entry in a navigation menu of the container application.

20. The system of claim 15, wherein the container application includes a log in webpage and a navigation menu.

\* \* \* \* \*